United States Patent
Ko

(10) Patent No.: US 8,151,729 B2
(45) Date of Patent: Apr. 10, 2012

(54) MASK ASSEMBLY AND METHOD OF FABRICATING THE SAME

(75) Inventor: Jung-Woo Ko, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 458 days.

(21) Appl. No.: 12/320,432

(22) Filed: Jan. 26, 2009

(65) Prior Publication Data

US 2009/0297768 A1    Dec. 3, 2009

(30) Foreign Application Priority Data

May 28, 2008   (KR) .................. 10-2008-0049748

(51) Int. Cl.
*B05C 1/00* (2006.01)
*B05C 11/11* (2006.01)
*B05B 15/04* (2006.01)
*C23C 16/00* (2006.01)

(52) U.S. Cl. ........ 118/504; 118/213; 118/301; 118/505; 118/721

(58) Field of Classification Search .................. 118/720, 118/721
See application file for complete search history.

(56) References Cited

U.S. PATENT DOCUMENTS

| | | | |
|---|---|---|---|
| 2004/0104197 A1* | 6/2004 | Shigemura et al. | 216/20 |
| 2007/0190889 A1* | 8/2007 | Lee et al. | 445/47 |
| 2009/0137180 A1 | 5/2009 | Sung et al. | |

FOREIGN PATENT DOCUMENTS

| | | |
|---|---|---|
| JP | 2003-217850 A | 7/2003 |
| JP | 2005-174843 A | 6/2005 |
| JP | 2006-322015 A | 11/2006 |
| KR | 10-2003-0093959 | 12/2003 |
| KR | 10-2004-0045284 | 6/2004 |
| KR | 10-2004-0084314 | 10/2004 |

* cited by examiner

*Primary Examiner* — Dah-Wei Yuan
*Assistant Examiner* — Binu Thomas
(74) *Attorney, Agent, or Firm* — Robert E. Bushnell, Esq.

(57) ABSTRACT

In a mask assembly and a method of fabricating the same, when the mask assembly is fabricated by tensile welding a pattern mask to a mask frame, a tensile welding portion of the pattern mask welded to the mask frame is structurally changed. Thus, the pattern mask can be easily welded to the mask frame, and patterns of the pattern mask can be precisely aligned, thereby minimizing stain failure rate due to the mask assembly. The mask assembly includes: a mask frame including an opening and a support; and a pattern mask including a pattern portion having a plurality of patterns arranged in a matrix and a plurality of tensile welding portions extending from the pattern portion in a first direction and spaced apart from each other in a second direction perpendicular to the first direction. The method includes: providing a mask frame, a support, and a pattern mask as described above; disposing the pattern mask and the mask frame in a unique manner; combining the pattern mask with the mask frame by welding; measuring an aligned state of the pattern arranged in the first direction of the pattern mask; and welding a tensile welding portion using a secondary welding process according to an aligned state.

13 Claims, 5 Drawing Sheets

MASK ASSEMBLY AND METHOD OF FABRICATING THE SAME

CLAIM OF PRIORITY

This application makes reference to, incorporates the same herein, and claims all benefits accruing under 35 U.S.C. §119 from an application for earlier filed in the Korean Intellectual Property Office on the 28 May 2008 and there duly assigned Serial No. 10-2008-0049748.

BACKGROUND OF THE INVENTION

1. Technical Field

The present invention relates to a mask assembly and a method of fabricating the same and, more particularly, to a mask assembly and a method of fabricating the same in which, when the mask assembly is fabricated by tensile welding a pattern mask to a mask frame, a tensile welding portion of the pattern mask welded to the mask frame is structurally changed to facilitate the welding of the pattern mask to the mask frame and fine alignment of a pattern of the pattern mask, thereby minimizing a stain failure rate due to the mask assembly.

2. Related Art

A flat panel display device (FPD) has been employed as a display device which supersedes a cathode ray tube (CRT) display device because the FPD is lightweight and thin. Typical examples of the FPD are a liquid crystal display (LCD) and an organic light emitting diode (OLED) display device. In comparison with the LCD, the OLED display device has a higher luminance and a wider viewing angle and can be made ultrathin because the OLED display device needs no backlight.

The OLED display device includes an organic thin layer having at least one organic emission layer (organic EML), which is interposed between an anode and a cathode. Thus, when a voltage is applied between the anode and the cathode, electrons injected through the cathode and holes injected through the anode recombine in the organic EML to produce excitons. As a result, light with a specific wavelength is generated due to the energy of the excitons.

During fabrication of the OLED display device, the cathode, the anode and the organic thin layer may be selectively formed on a substrate formed of glass, stainless steel or synthetic resin by means of a photolithography method or a deposition method using a mask assembly including a pattern with a plurality of slits. During the photolithography method, after coating photoresist on a portion of the substrate, the photoresist may be delaminated or etched using a wet or dry etching process. In this case, moisture may diffuse into the substrate during the etching process. Accordingly, a material layer, for example, the organic thin layer, which may be degraded due to moisture, may be typically formed using the deposition method using the mask assembly.

In order to display full color, the OLED display device includes an OLED having red(R), green (G) and blue (B) organic EMLs. In detail, a mask pattern having a plurality of openings is aligned on the substrate where the OLED having the R, G and B organic EMLs will be deposited. Thereafter, the R, G and B organic EMLs are deposited through the openings of the mask pattern so as to have desired shapes of patterns. As a result, the OLED having the R, G and B organic EMLs is formed on a predetermined region of the substrate. Accordingly, it is very important to precisely align the mask pattern on the substrate.

In order to form the mask pattern with higher positional precision, a plurality of stick pattern masks, patterns of which are arranged in a first direction may be tensile-welded to a mask frame. However, it is necessary to prevent formation of a gap between the stick pattern masks, and aligning and welding the stick pattern masks are not easy due to the movement of the stick pattern masks.

In addition, in order to solve the above-described problem of the stick pattern masks, a pattern mask having a pattern portion with patterns arranged in a matrix may be tensile-welded to a mask frame. However, when corrective welding is performed in order to precisely align patterns arranged in each row or column, the positions of patterns disposed in neighboring rows or columns are readjusted, thereby lowering positional precision of the mask assembly and increasing a stain failure rate. A stain failure occurs when the mask patterns in a mask assembly are not fully aligned and a gap exists between neighboring mask patterns, causing undesirable deposition portions through the gap during a subsequent deposition process, and thus resulting in a stain on a substrate. The term "stain failure rate" indicates the likelihood of a stain failure when a mask assembly is used for deposition.

SUMMARY OF THE INVENTION

The present invention provides a mask assembly and a method of fabricating the same in which a tensile welding portion extending from a pattern portion of a pattern mask with patterns arranged in a matrix is structurally changed so that the positions of patterns disposed in neighboring rows or columns may not be readjusted due to a corrective welding process. As a result, the pattern mask may be easily welded to a mask frame, and the mask assembly may be fabricated with high positional precision.

According to an aspect of the present invention, a mask assembly includes: a mask frame including an opening and a support; and a pattern mask including a pattern portion having a plurality of patterns arranged in a matrix and a plurality of tensile welding portions extending from the pattern portion in a first direction and spaced apart from each other in a second direction perpendicular to the first direction.

According to another aspect of the present invention, a method of fabricating a mask assembly includes: providing a mask frame including an opening and a support; providing a pattern mask including a pattern portion having a plurality of patterns arranged in a matrix and a plurality of tensile welding portions extending from the pattern portion in a first direction and spaced apart from one another in a second direction perpendicular to the first direction; disposing the pattern mask and the mask frame such that the pattern portion of the pattern mask is disposed in the opening of the mask frame and the tensile welding portions of the pattern mask contact the support of the mask frame; combining the pattern mask with the mask frame by welding the tensile welding portions of the pattern mask to the support of the mask frame using a primary welding process; measuring an aligned state of the pattern arranged in the first direction of the pattern mask; and welding the tensile welding portion extending from the pattern arranged in the first direction to the support using a secondary welding process according to the aligned state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
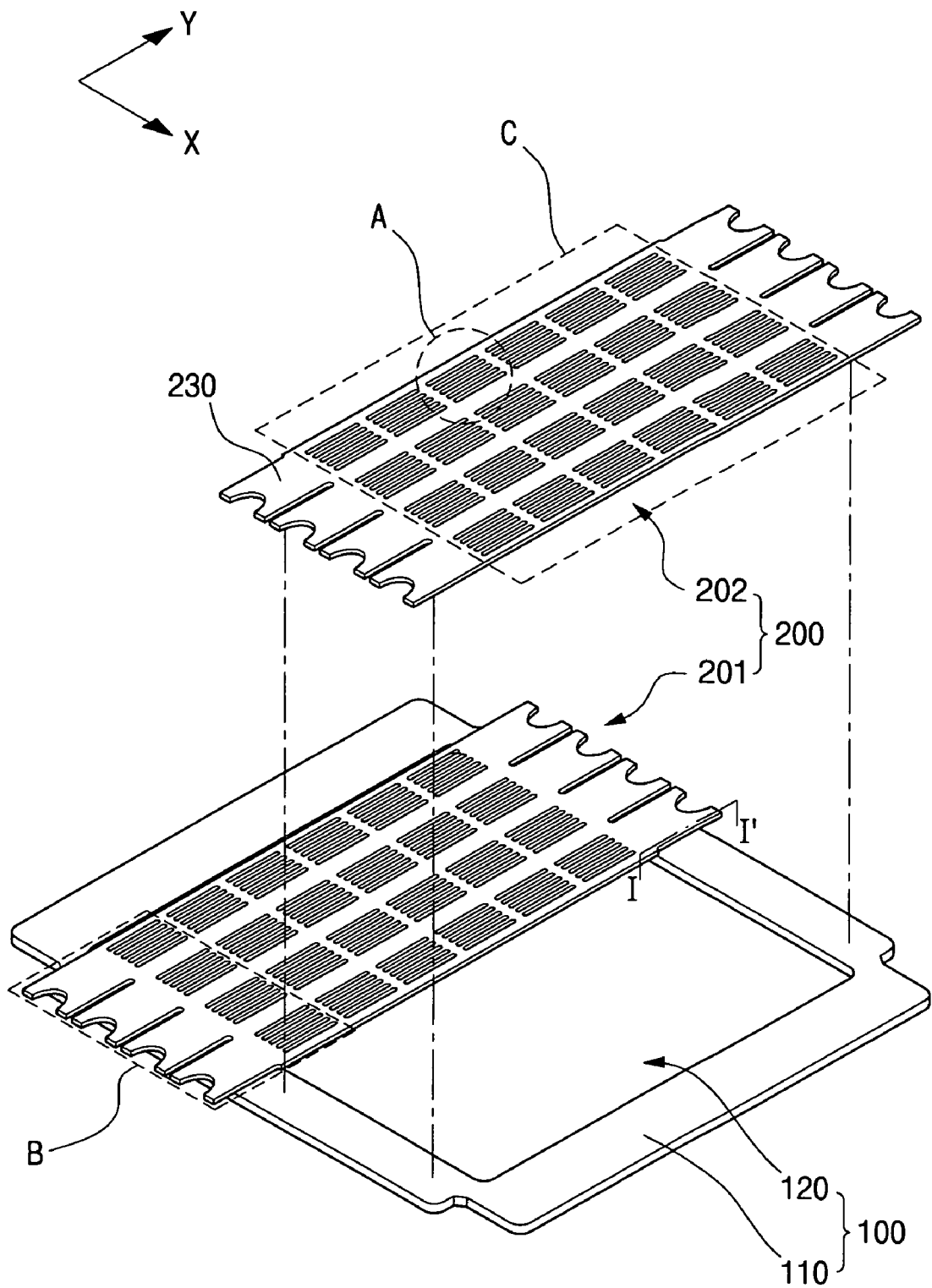
FIG. 1 is an exploded perspective view of a mask assembly according to an exemplary embodiment of the present invention.

The present invention will be described more fully hereinafter with reference to the accompanying drawings, in which exemplary embodiments of the invention are shown. The same reference numerals are used to denote the same elements throughout the specification. It will also be understood that when a portion is referred to as being "connected to" another portion, it can be directly connected to the other portion or electrically connected to the other portion by intervening a third portion therebetween. In the drawings, the thicknesses of layers and regions are exaggerated for clarity.

Figure 2A:
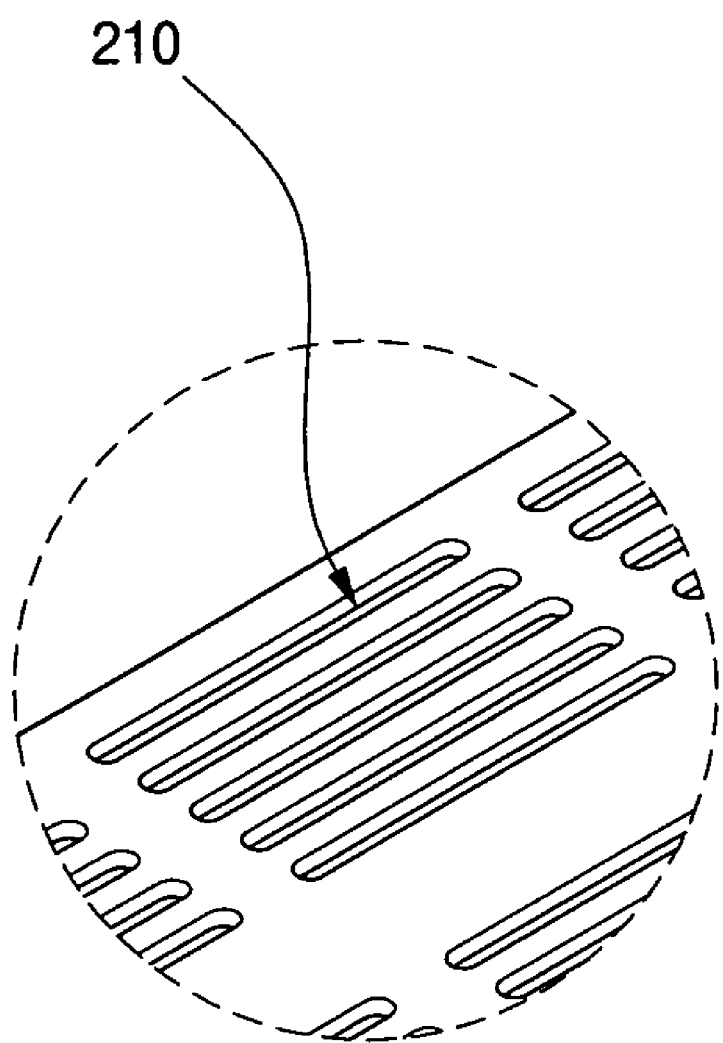
FIG. 2A is an enlarged perspective view of a region "A" of FIG. 1, illustrating a portion of the mask assembly according to the exemplary embodiment of the present invention.
Figure 2B:
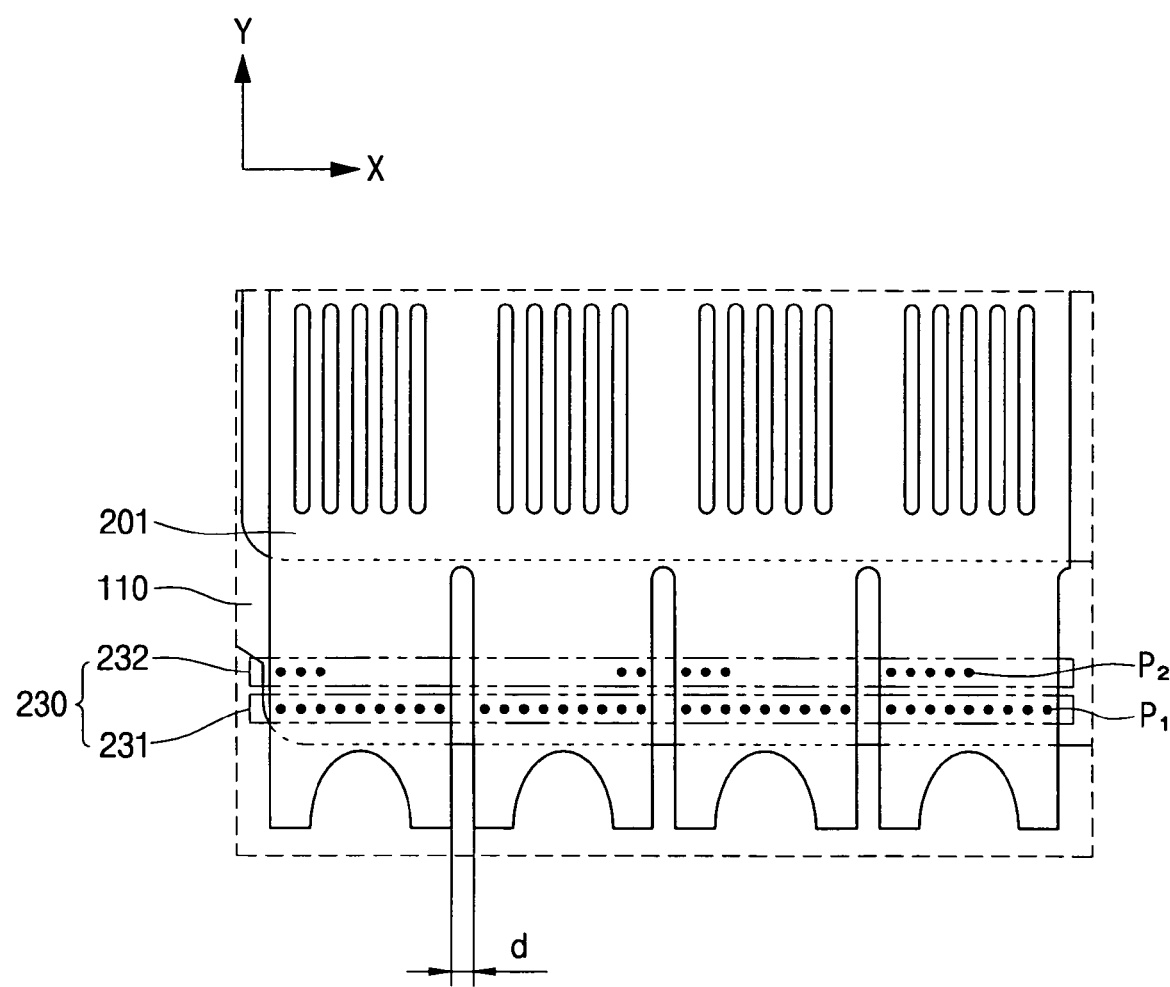
FIG. 2B is an enlarged plan view of a region "B" of FIG. 1, illustrating another portion of the mask assembly according to the exemplary embodiment of the present invention.

FIG. 1 is an exploded perspective view of a mask assembly according to an exemplary embodiment of the present invention, FIG. 2A is an enlarged perspective view of a region "A" of FIG. 1, illustrating a pattern of the mask assembly of FIG. 1, and FIG. 2B is an enlarged plan view of a region "B" of FIG. 1, illustrating a welding region between a pattern mask and a mask frame in the mask assembly of FIG. 1.

Referring to FIGS. 1, 2A, and 2B, a mask assembly according to an exemplary embodiment of the present invention includes a mask frame 100 and a pattern mask 200. The mask frame 100 includes an opening 120 and a support 110. The pattern mask 200 includes a pattern portion C having a plurality of patterns A and a plurality of tensile welding portions 230. The tensile welding portions 230 extend in a first direction Y from the pattern portion C so as to be welded to the support 110. Also, the tensile welding portions 230 are spaced apart from one another in a second direction X perpendicular to the first direction Y. In this case, it is described in the present embodiment that two pattern masks 201 and 202 are welded to the mask frame 100, but only one pattern mask 200 or at least three pattern masks 200 may be welded to the mask frame 100.

The pattern mask 200 may be a fine metal mask made of a thin metal layer, which may be formed of one selected from the group consisting of steel use stainless (SUS), Invar, nickel (Ni), cobalt (Co), and an alloy thereof.

In addition, when a plurality of pattern masks 200 are welded to the mask frame 100, the pattern portion C of the pattern mask 200 may protrude toward an adjacent pattern mask 200, not toward the tensile welding portion 230 of the pattern mask 200, such that pattern portions C of adjacent pattern masks 200 contact each other, while tensile welding portions 230 of the adjacent pattern masks 200 are spaced apart from each other.

The pattern A of the pattern mask 200 may include a plurality of slits 210 (FIG. 2A) arranged in a matrix in the first and second directions X and Y. In this case, it is described in the present embodiment that the pattern A (FIG. 1) includes a plurality of slits 210 having an elliptical shape, a major axis of which is in the first direction Y, but the pattern A may include only one slit 210 (FIG. 2A) having an elliptical shape, a major axis of which is in the second direction X.

The tensile welding portions 230 (FIG. 1) may extend from the pattern portion C having the patterns A in the first direction Y, and tensile welding portions 230 neighboring in the second direction X may be spaced apart from each other. In this case, a distance between the tensile welding portions 230 neighboring in the second direction X may be the same as a distance between the patterns A arranged in the second direction X in order to minimize readjustment of the positions of the patterns A neighboring in the second direction X due to a corrective welding process.

Also, each of the tensile welding portions 230 may include a first welding portion 231 (FIG. 2B) for combining the pattern mask 230 with the mask frame 100 and a second welding portion 232 for correcting an aligned state of the pattern A such that a correction welding point P2 for aligning the aligned state of the pattern A does not affect a combination welding point P1 for combining the pattern mask 230 with the mask frame 100. As a result, cohesion between the pattern mask 230 and the mask frame 100 may be prevented from deteriorating due to the corrective welding process for aligning the pattern A.

In contrast to the description of the present embodiment, the combination welding point P1 for combining the pattern mask 230 with the mask frame 100 may be disposed closer to the pattern portion C than the correction welding point P2 for aligning the pattern A. However, considering that combining the pattern mask 230 with the mask frame 100 is followed by correcting the alignment of the pattern A, the correction welding point P2 may be disposed closer to the pattern portion C than the combination welding point P1 as in the present embodiment.

The mask frame 100 (FIG. 1) may include the opening 120 which corresponds to the pattern portion C of the pattern mask 200, and the support 110 which contacts and is welded to the tensile welding portions 230 of the pattern mask 200. The support 110 of the mask frame 100 may be formed of the same material as the pattern mask 200 in order to reinforce the welding of the mask frame 100 to the pattern mask 200.

Figure 3A:
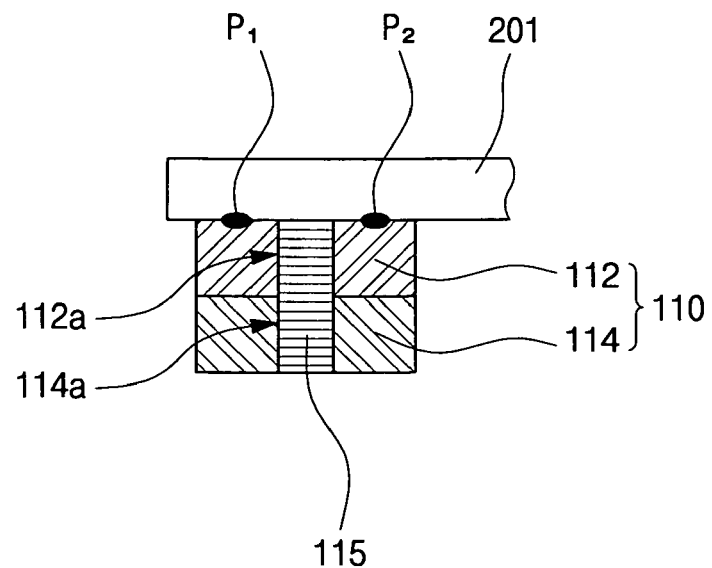
FIGS. 3A thru 3C are cross-sectional views taken along line I-I' of FIG. 1, illustrating mask frames of the mask assembly according to the exemplary embodiment of the present invention.
Figure 3B:
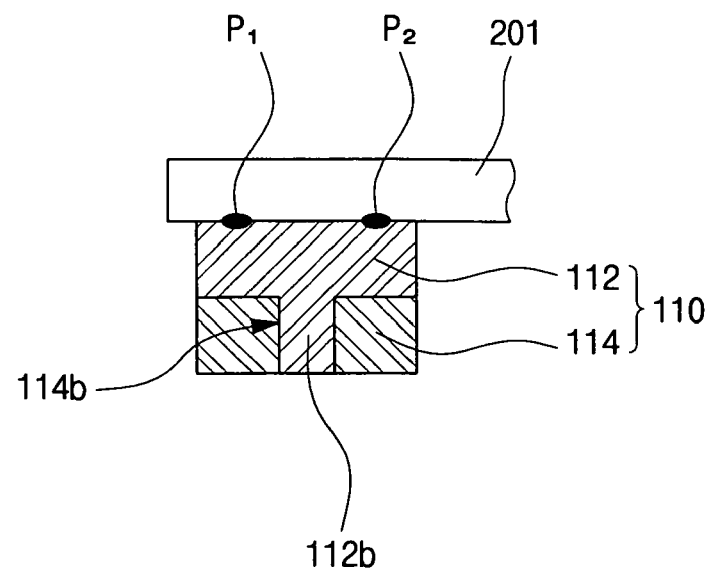
Figure 3C:
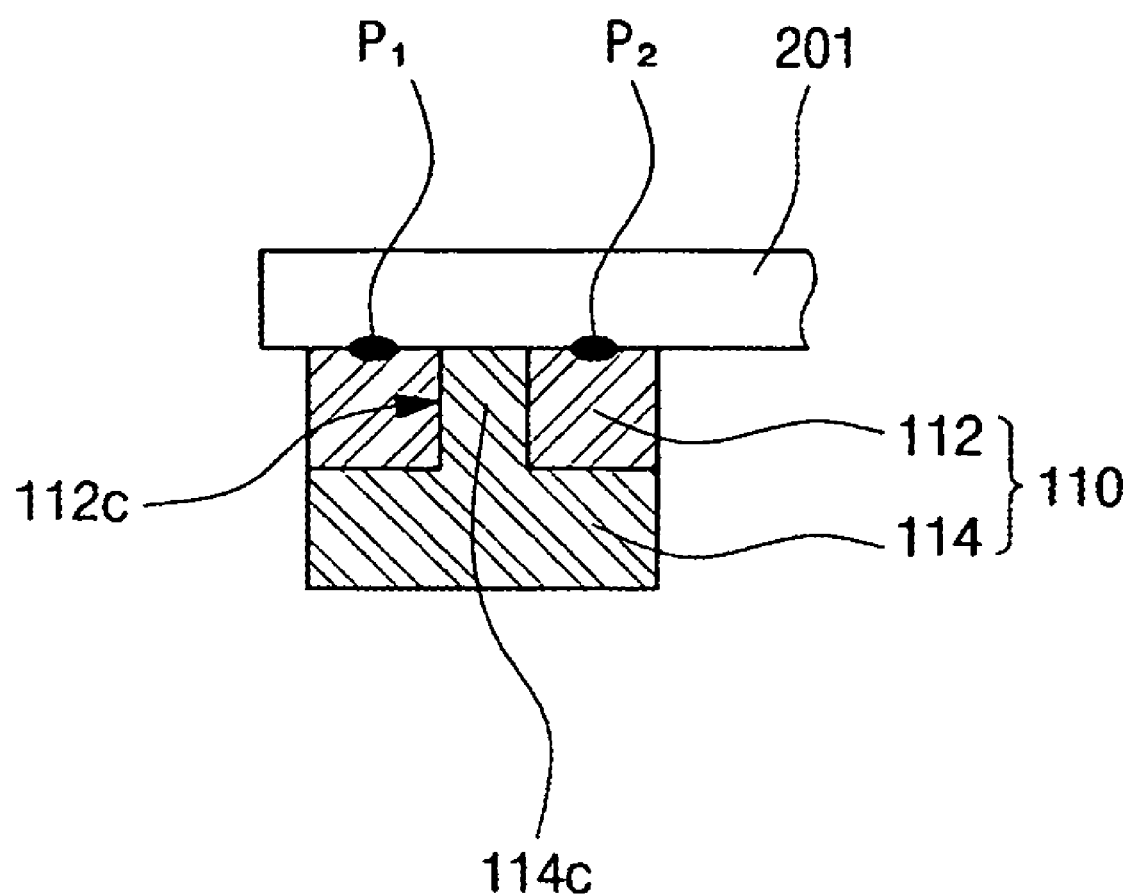

FIGS. 3A thru 3C are cross-sectional views taken along line I-I' of FIG. 1, illustrating mask frames of the mask assembly according to the exemplary embodiment of the present invention.

Referring to FIGS. 3A thru 3C, the support 110 of the mask frame 100 may include a first mask frame 112 contacting the pattern mask 200 and a second mask frame 114 combined with the first mask frame 112 and formed of a different material than the first mask frame 112. When the weight of the mask frame 100 is increased, the entire weight of the mask assembly is increased, the mask assembly becomes less convenient in handling, and the productivity of display devices using the mask assembly is reduced. Therefore, the second mask frame 114 may be formed of a material lighter in weight than the first mask frame 112 in consideration of convenience in handling and productivity.

Since the first mask frame 112 contacts a plurality of tensile welding portions 230 (FIG. 1) of the pattern mask 200, the first mask frame 112 may be formed of the same material as the pattern mask 200 in order to facilitate welding of the mask frame 100 to the pattern mask 200.

Also, since the pattern mask 200 is formed of one selected from the group consisting of SUS, Invar, nickel (Ni), cobalt (Co), and an alloy thereof, the second mask frame 114 (FIG.

3A) may be formed of one selected from the group consisting of aluminum (Al), magnesium (Mg), titanium (Ti), and an alloy thereof.

Methods of combining the first mask frame 112 with the second mask frame 114 will now be described with reference to FIGS. 3A thru 3C.

Referring to FIG. 3A, first holes 112a and 114a may be respectively formed in the corresponding regions of the first and second mask frames 112 and 114, respectively, and a connection member 115 may be inserted into the first holes 112a and 114a.

Referring to FIG. 3B, a protrusion 112b protruding toward the second mask frame 114 may be formed on the first mask frame 112, and a second hole 114b corresponding to the protrusion 112b may be formed on the second mask frame 114. Alternatively, referring to FIG. 3C, a protrusion 114c protruding toward the first mask frame 112 may be formed on the second mask frame 114, and a third hole 112c corresponding to the protrusion 114c may be formed on the first mask frame 112.

A method of manufacturing a mask assembly according to an exemplary embodiment of the present invention will now be described with reference to FIGS. 1, 2A, 2B, and 3A thru 3C.

Initially, a mask frame 110 and a pattern mask 200 are provided. In detail, the mask frame 110 may include an opening 120 and a support 110. The pattern mask 200 includes a pattern portion C having a plurality of patterns A arranged in a matrix and a plurality of tensile welding portions 230 extending from the pattern portion C in a first direction Y and spaced apart from one another in a second direction X perpendicular to the first direction Y.

In this case, the mask frame 100 may be formed by combining a first mask frame 112 with a second mask frame 114. The first mask frame 112 may contact a plurality of tensile welding portions 230 of the pattern mask 200. The second mask frame 114 may be formed of a different material than the first mask frame 112. In order to minimize the weight of the mask frame 100, the second mask frame 114 may be formed of a material lighter in weight than the first mask frame 112.

Thereafter, the pattern mask 200 and the mask frame 100 are disposed such that the pattern portion C of the pattern mask 200 is disposed in the opening 120 of the mask frame 100, and a plurality of tensile welding portions 230 of the pattern mask 200 contact the support 110 of the mask frame 100. After that, the tensile welding portions 230 of the pattern mask 200 are tensile-welded to the support 110 of the mask frame 110 using a primary welding process.

In this regard, the primary welding process may be performed at a point P1 spaced a predetermined distance apart from the pattern portion C in consideration of a subsequent correction process for correcting alignment of the pattern A arranged in the first direction Y.

In addition, when a plurality of pattern masks 200 are tensile-welded to the mask frame 100, the pattern portion C of the pattern mask 200 may be formed so as to protrude toward an adjacent pattern mask 200, not toward the tensile welding portion 230 of the pattern mask 200, such that pattern portions C of adjacent pattern masks 200 contact each other, while tensile welding portions 230 of the adjacent pattern masks 200 are spaced apart from each other.

Subsequently, an aligned state of the pattern A arranged in the first direction Y of the pattern mask 200 is measured, and the tensile welding portion extending from the pattern A arranged in the first direction Y is welded to the support 110 using a secondary welding process according to the aligned state, thereby correcting the alignment of the pattern A arranged in the first direction Y. In this case, the secondary welding process may be performed on a plurality of tensile welding portions 230 at the same time. However, when aligned states of the respective patterns A arranged in the first direction Y are different and there is a great deviation between their aligned states, the secondary welding process may be separately performed on each of the tensile welding portions 230 of the pattern mask 200 which are spaced apart from each other in the second direction X.

Therefore, according to the present invention, a plurality of tensile welding portions 230 are formed so as to extend from the pattern portion C of the pattern mask 200 and so as to be spaced apart from each other in the second direction X perpendicular to the first direction Y. As a result, the pattern mask 200 can be easily welded to the mask frame 100, and the positions of patterns A neighboring in the second direction X are not readjusted during a corrective welding process of the pattern mask 200.

According to the present invention as described above, a plurality of tensile welding portions are formed so as to extend from a pattern portion of a pattern mask in a first direction and so as to be spaced apart from each other in a second direction perpendicular to the first direction, so that the positions of patterns neighboring in the second direction cannot be readjusted during a corrective welding process of the pattern mask. Therefore, the pattern mask can be easily welded to a mask frame, and a mask assembly can be formed with a high positional precision, thereby minimizing a stain failure rate due to the mask assembly.

Although the present invention has been described with reference to certain exemplary embodiments thereof, it will be understood by those skilled in the art that a variety of modifications and variations may be made to the present invention without departing from the spirit or scope of the present invention as defined in the appended claims, and their equivalents.

What is claimed is:

1. A mask assembly, comprising:
a mask frame including an opening and a support; and
a pattern mask including a pattern portion having a plurality of patterns arranged in a matrix, and a plurality of tensile welding portions extending from the pattern portion in a first direction and spaced apart from each other in a second direction perpendicular to the first direction,
the pattern mask comprises a cut-away portion formed between each pair of neighboring tensile welding portions.

2. The mask assembly according to claim 1, wherein a distance between the tensile welding portions neighboring in the second direction is the same as a distance between the patterns arranged in the second direction.

3. The mask assembly according to claim 1, wherein each of the tensile welding portions includes:
a first welding portion for combining the tensile welding portion with the support; and
a second welding portion for correcting so as to provide an aligned state of the corresponding pattern.

4. The mask assembly according to claim 1, wherein the pattern mask is a metal mask.

5. The mask assembly according to claim 4, wherein the pattern mask is formed of a material selected from the group consisting of steel use stainless (SUS), Invar, nickel (Ni), cobalt (Co), and an alloy thereof.

6. The mask assembly according to claim 1, wherein the mask frame comprises:

a first mask frame contacting the tensile welding portions of the pattern mask; and a second mask frame combined with the first mask frame.

7. The mask assembly according to claim 6, wherein the first mask frame is formed of a same material as the pattern mask.

8. The mask assembly according to claim 6, wherein the second mask frame is lighter in weight than the first mask frame.

9. The mask assembly according to claim 8, wherein the second mask frame is formed of a material selected from the group consisting of aluminum (Al), magnesium (Mg), titanium (Ti), and an alloy thereof.

10. The mask assembly according to claim 6, wherein the first and second mask frames have first holes formed in corresponding regions thereof, said mask frame further comprising a connection member inserted in the first holes to combine the first mask frame with the second mask frame.

11. The mask assembly according to claim 6, wherein one of the first and second mask frames includes a protrusion protruding toward another of the first and second mask frames which has a hole corresponding to the protrusion.

12. The mask assembly according to claim 1, wherein a plurality of pattern masks are welded to the mask frame, and pattern portions of adjacent pattern masks contact each other.

13. The mask assembly according to claim 1, wherein each of the patterns includes at least one slit.

* * * * *